(12) United States Patent  
Fujiwara et al.

(10) Patent No.: US 8,109,578 B2
(45) Date of Patent: Feb. 7, 2012

(54) HUB WHEEL, HUB UNIT, AND METHOD OF WORKING HUB WHEEL

(75) Inventors: Yosuke Fujiwara, Nara-ken (JP); Kouichi Shimizu, Kashiwara (JP)

(73) Assignee: JTEKT Corporation, Osaka (JP)

( * ) Notice: Subject to any disclaimer, the term of this patent is extended or adjusted under 35 U.S.C. 154(b) by 161 days.

(21) Appl. No.: 12/311,223

(22) PCT Filed: Jul. 23, 2007

(86) PCT No.: PCT/JP2007/064413
§ 371 (c)(1), (2), (4) Date: Mar. 23, 2009

(87) PCT Pub. No.: WO2008/038451
PCT Pub. Date: Apr. 3, 2008

(65) Prior Publication Data
US 2010/0026081 A1  Feb. 4, 2010

(30) Foreign Application Priority Data
Sep. 25, 2006  (JP) .................................. 2006-259688

(51) Int. Cl.
*B60B 25/00* (2006.01)
*B21D 53/26* (2006.01)
(52) U.S. Cl. ................. 301/35.621; 301/6.8; 301/105.1; 29/894.362
(58) Field of Classification Search .................... 301/6.8, 301/35.621, 35.623, 35.632, 105.1; 29/894.36, 29/894.362
See application file for complete search history.

(56) References Cited

U.S. PATENT DOCUMENTS

| 2,195,589 | A | * | 4/1940 | Eksergian | 301/36.1 |
| 5,490,720 | A | * | 2/1996 | Archibald | 301/35.621 |
| 5,651,588 | A | * | 7/1997 | Kato | 301/35.626 |
| 5,884,980 | A | * | 3/1999 | Visser et al. | 301/6.1 |

(Continued)

FOREIGN PATENT DOCUMENTS
EP  1127713 A2  8/2001
(Continued)

OTHER PUBLICATIONS
European Search Report dated Feb. 22, 2011.

*Primary Examiner* — Jason Bellinger
(74) *Attorney, Agent, or Firm* — McGinn IP Law Group, PLLC

(57) ABSTRACT

Bolt holes 23 are provided for press fitting and securing bolts 5 for mounting a brake rotor 4 to a flange 22 of a hub wheel. Each bolt hole 23 includes widening portions 28a, 28b, which are tapered to widen from the center portion of the bolt hole 23 toward a brake rotor mounting surface 25 of the flange 22. The widening portions 28a, 28b are formed by two tapered surfaces having different taper angles with respect to the axis of the bolt hole 23 from an opening rim of the bolt hole toward the inside. The taper angle of an outer tapered surface connected to the opening rim is greater than the taper angle of an inner tapered surface connected to the outer tapered surface. In machining the hub wheel 2 configured as described above, the brake rotor mounting surface 25 is finished after machining the bolt holes 23.

16 Claims, 5 Drawing Sheets

U.S. PATENT DOCUMENTS

| | | | |
|---|---|---|---|
| 6,415,508 B1 * | 7/2002 | Laps | 29/894.362 |
| 6,672,679 B2 * | 1/2004 | Kaneko | 301/105.1 |
| 6,829,825 B1 * | 12/2004 | Bowman et al. | 29/894.32 |
| 7,044,563 B2 * | 5/2006 | Suzuki | 301/105.1 |
| 2005/0226699 A1 | 10/2005 | Kawatani et al. | |
| 2005/0231025 A1 | 10/2005 | Yasumura et al. | |

FOREIGN PATENT DOCUMENTS

| | | |
|---|---|---|
| JP | 2005-54999 | 3/2005 |
| JP | 2005-239115 | 9/2005 |
| JP | 2005-306157 | 11/2005 |

* cited by examiner

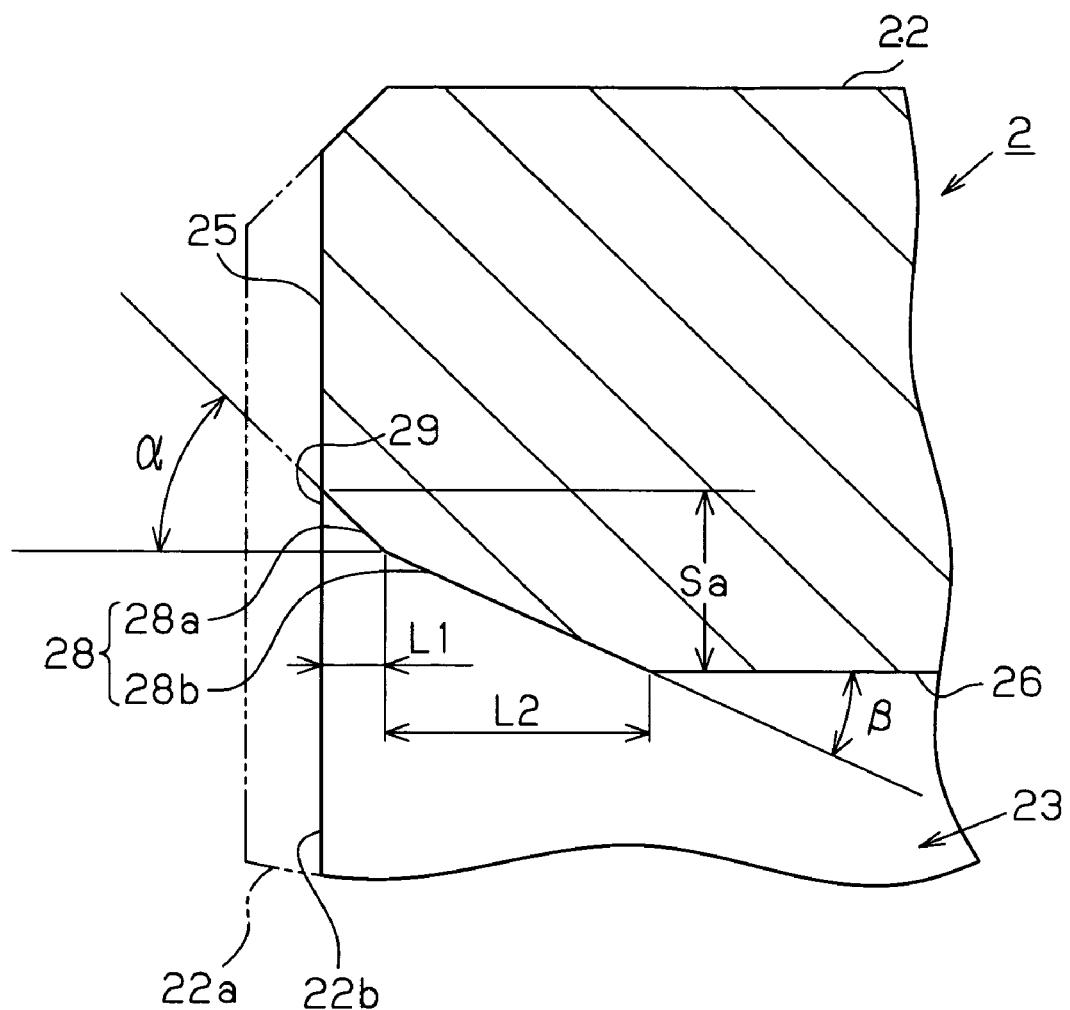

HUB WHEEL, HUB UNIT, AND METHOD OF WORKING HUB WHEEL

FIELD OF THE INVENTION

The present invention relates to a wheel hub that includes a flange for mounting a brake rotor, which flange includes bolt holes in which bolts for mounting the brake rotor are press fitted. The present invention also pertains to a hub unit including the wheel hub and a method for machining the wheel hub.

BACKGROUND OF THE INVENTION

A wheel hub of a vehicle hub unit generally includes a flange for mounting a brake rotor formed to face radially outward. The flange is provided with bolt holes for mounting the brake rotor. Bolts for mounting the brake rotor are previously press fitted in the bolt holes of the hub unit before the hub unit is mounted on a vehicle drive shaft so that the brake rotor can be attached to the hub unit mounted on the drive shaft. The bolts are then inserted in bolt holes of the brake rotor, and a nut is tightened to a threaded portion of each bolt, so that the brake rotor is secured to the hub unit. Also, each bolt is press fitted in the associated bolt hole of the hub unit by plastically deforming and engaging a serration formed in the vicinity of a head portion of a threaded shaft portion of the bolt in a circular inner circumferential surface of the bolt hole.

By press fitting each bolt while plastically deforming and engaging the serration of the bolt in the circular inner circumferential surface of the bolt hole, however, part of the flange displaced by the plastic deformation bulges on a brake rotor mounting surface of the flange. When such a bulging portion of part of the flange exists on the brake rotor mounting surface, the brake rotor can not be secured to the flange in close contact. As a result, a gap between the brake rotor and a brake pad becomes uneven in the radial direction, which might cause a problem of runout of the brake rotor such as uneven wear of the brake pad.

As a method for solving such a problem, a wheel huh has been proposed in which a widening portion is provided in each bolt hole as disclosed in Japanese Laid-Open Patent Publication No. 2005-54999. FIG. 4 shows the shape of a bolt hole 102 of a flange 101 in a conventional hub unit, and a state in which a bolt 103 is press fitted in the bolt hole 102. As shown in FIG. 4, a first widening portion 105, which is tapered from a bolt seating surface 104 toward the bolt hole 102, is formed at part of the bolt hole 102 close to the bolt seating surface 104 against which a head portion 103a of the bolt 103 abuts. Also, a second widening portion 108, which is tapered from a brake rotor mounting surface 107 toward the bolt hole 102, is formed at part of the bolt hole 102 close to the brake rotor mounting surface 107 on which the brake rotor 106 is mounted. Furthermore, a small diameter portion 109 is formed between the first widening portion 105 and the second widening portion 108. Then, the bolt 103 is press fitted in the bolt hole 102 by plastically deforming and engaging a serration 103b of the bolt 103 in the small diameter portion 109.

Also, the conventional wheel hub 110 includes bolt holes 102 configured as described above in the flange 101, and the bolt holes 102 are machined after finishing the brake rotor mounting surface 107.

DISCLOSURE OF THE INVENTION

Therefore, when the thickness of the flange 101 is thin, machining the bolt holes 102 might deform the flange 101, which might deteriorate the accuracy of the brake rotor mounting surface 107 of the flange 101. To solve this problem, finishing of the brake rotor mounting surface 107 is preferably performed after machining the bolt holes 102 as shown in FIG. 5. In this case, however, burrs might be formed at an opening rim 108a of the second widening portion 108 of each bolt hole 102. When such burrs are formed, the burrs might be sandwiched between the brake rotor 106 and the brake rotor mounting surface 107, which hinders the brake rotor 106 from being mounted on the brake rotor mounting surface 107 in close contact. As a result, runout of the brake rotor 106 might occur. Also, the taper angle $\theta$ of the second widening portion 108 with respect to the axis of the bolt hole 102 may be increased to reduce generation of such burrs. However, when the taper angle $\theta$ is increased, the bore diameter of the opening rim 108a might vary by a large amount due to the machining accuracy of the second widening portion 108 and the machining accuracy of the finishing of the brake rotor mounting surface 107. When the bore diameter of the opening rim 108a is increased, the gap between the opening rim 108a and the shaft portion of the bolt 103 (approximately equal to the width S in FIG. 5) is increased, which might reduce the tightening force of the bolt 103. Improving the machining accuracy of the second widening portion 108 and the machining accuracy of the finishing of the brake rotor mounting surface 107 requires time for machining, and increases costs.

Accordingly, it is an objective of the present invention to improve the mounting performance of a brake rotor on a wheel hub configuring a hub unit, and to improve processability of the wheel hub.

A wheel hub of the present invention includes a flange for mounting a brake rotor, which flange is formed to face radially outward, and bolt holes formed in the flange. Bolts for mounting the brake rotor are press fitted and secured in the bolt holes. Each bolt hole includes a widening portion, which is tapered to widen from a center portion of the bolt hole to a brake rotor mounting surface of the flange. The widening portion is formed by two tapered surfaces having different taper angles with respect to the axis of the bolt hole from an opening rim of the bolt hole toward the inside. The taper angle of an outer tapered surface connected to the opening rim is greater than the taper angle of an inner tapered surface connected to the outer tapered surface.

Since the wheel hub of the present invention is configured as described above, part of the flange displaced toward the brake rotor mounting surface by press fitting the bolt is absorbed by the widening portion formed on a side of the brake rotor mounting surface. Also, since the taper angle of the tapered surface of the widening portion located close to the opening rim is formed greater than the taper angle of the tapered surface of the widening portion located toward the inside, burrs formed on the opening rims of the bolt holes are reduced when the brake rotor mounting surface is finished after drilling the bolt holes. This permits operation for removing burrs to be omitted. Thus, the present invention reduces deformation of the brake rotor mounting surface caused by machining the bolt holes, generation of burrs by finishing the brake rotor mounting surface, and runout of the brake rotor that arise from deformation of the brake rotor mounting surface caused by press fitting the bolts in the bolt holes. Also, according to the wheel hub of the present invention, the processability of the wheel hub is improved since the bolt holes are machined before finishing the brake rotor mounting surface and operation for removing burrs after finishing the brake rotor mounting surface is made unnecessary.

Furthermore, in the wheel hub of the present invention, the brake rotor mounting surface is preferably a surface finished after machining the bolt holes. In this case, even if the brake rotor mounting surface is deformed by machining the bolt holes, the deformation is removed by finishing the brake rotor mounting surface. This reduces runout of the brake rotor.

A hub unit of the present invention preferably includes the wheel hub configured as described above. In this case, runout of the brake rotor mounted on the hub unit is reduced.

A method for machining a wheel hub according to the present invention relates to a method for machining the wheel hub configured as described above. According to the machining method, the brake rotor mounting surface is finished after machining the bolt holes by a series of machining processes.

In this case, deformation of the brake rotor mounting surface caused by machining the bolt holes is removed by finishing the brake rotor mounting surface. Also, the taper angle of the tapered surface of the widening portion located close to the opening rim is formed greater than the taper angle of the tapered surface of the widening portion located toward the inside. Thus, generation of burrs on the opening rims of the bolt holes is reduced, and operation for removing burrs on the opening rims of the bolt holes after finishing the brake rotor mounting surface is omitted. Furthermore, machining of the bolt holes is performed by a series of processes before finishing the brake rotor mounting surface. Thus, the processability of the wheel hub is improved.

BRIEF DESCRIPTION OF THE DRAWINGS

FIG. 2 includes diagrams illustrating the shape of the bolt hole of the wheel hub in the hub unit and a process for machining the wheel hub, where

FIG. 3 is an enlarged cross-sectional view illustrating the second widening portion of the wheel hub.

DETAILED DESCRIPTION OF THE INVENTION

One embodiment of the present invention will now be described with reference to FIGS. 1 to 3. A hub unit used in a drive wheel of a vehicle is explained as an example.

Figure 1:
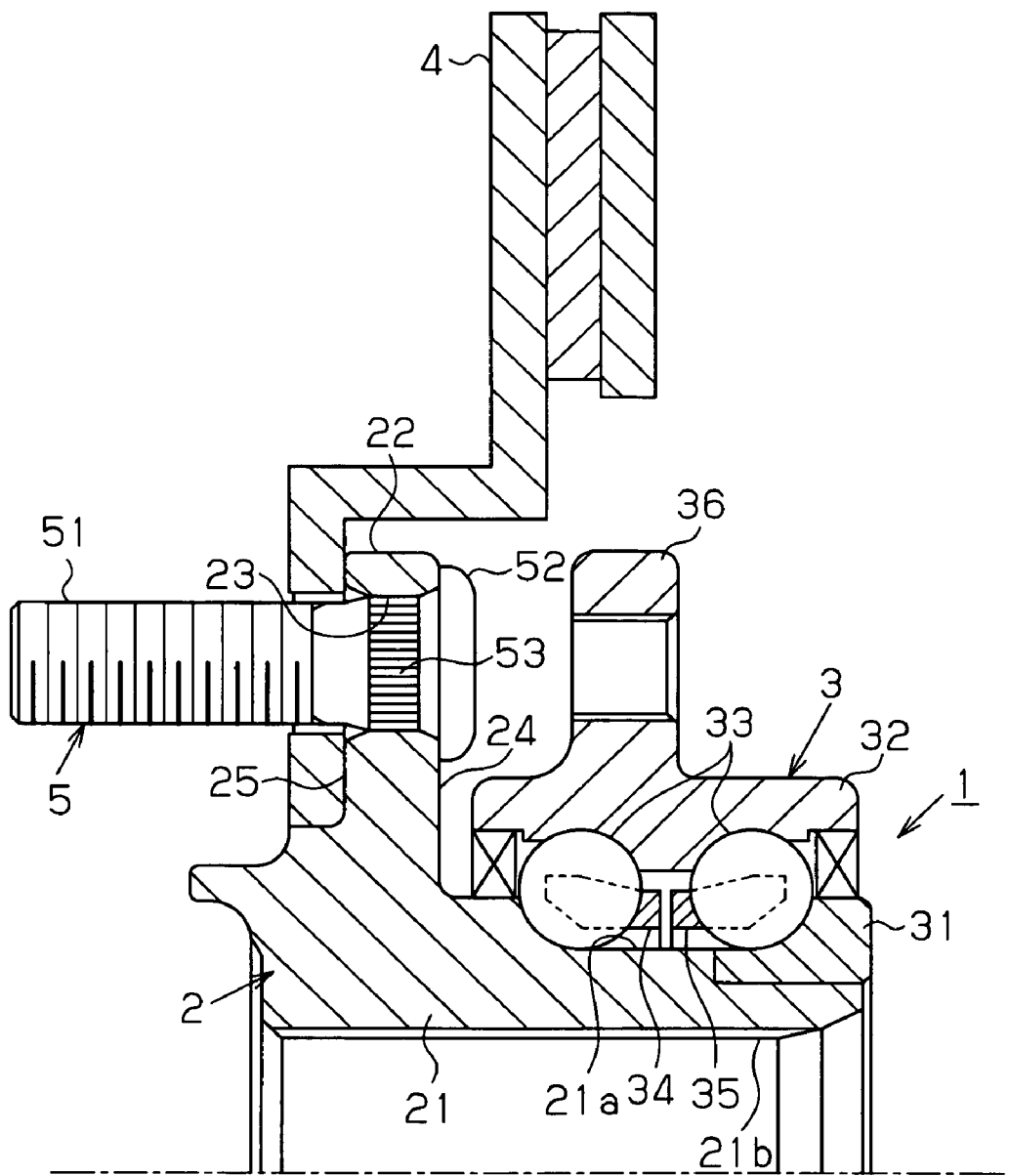
FIG. 1 is a cross-sectional view illustrating a hub unit according to a preferred embodiment of the present invention.

As shown in FIG. 1, a hub unit 1 of the preferred embodiment includes a wheel hub 2 and a double row angular contact ball bearing 3.

The wheel hub 2 is provided with a flange 22, which extends radially outward to the outside of a hollow axial portion 21 (left side in FIG. 1).

The angular contact ball bearing 3 includes a first inner ring 31, which is fitted to a small diameter outer circumferential surface of the axial portion 21 of the wheel hub 2 and has a single orbital path, an outer ring 32, which is provided with two rows of raceway grooves, balls 33 arranged in two rows, and two crown-shaped retainers 34, 35. Also, an outer circumferential surface 21a of a large diameter portion of the axial portion 21 of the wheel hub 2 of the angular contact ball bearing 3 configures a second inner ring. The angular contact ball bearing 3 configured as described above is mounted on the axial portion 21 of the wheel hub 2. Moreover, a flange 36, which extends radially outward, is provided on the outer circumference of the outer ring 32. The outer ring 32 is fixed to a shaft case (not shown) via the flange 36. Furthermore, a spline 21b is formed on the inner circumferential surface of the wheel hub 2 to permit a drive shaft (not shown) of the vehicle to be spline-fitted.

The flange 22 of the wheel hub 2 is provided with bolt holes 23 for mounting a brake rotor 4 of a disc brake gear and a wheel (not shown). In order to mount the brake rotor 4 on the flange 22 after mounting the hub unit 1 to the drive shaft (not shown), a bolt 5 for mounting the brake rotor 4 is press fitted to each bolt hole 23 of the wheel hub 2 before mounting the hub unit 1 to the drive shaft. As shown in FIG. 1, a serration 53 is formed in the vicinity of a head portion 52 of a threaded shaft portion 51 of each bolt 5. Also, an inner side surface of the flange 22 corresponds to a bolt seating surface 24 on which the head portion 52 of each bolt 5 abuts against, and an outer side surface of the flange 22 corresponds to a brake rotor mounting surface 25 on which the brake rotor 4 abuts against and is mounted.

Next, a method for machining the wheel hub 2 of the hub unit 1 according to the preferred embodiment will be described.

Figure 2A:
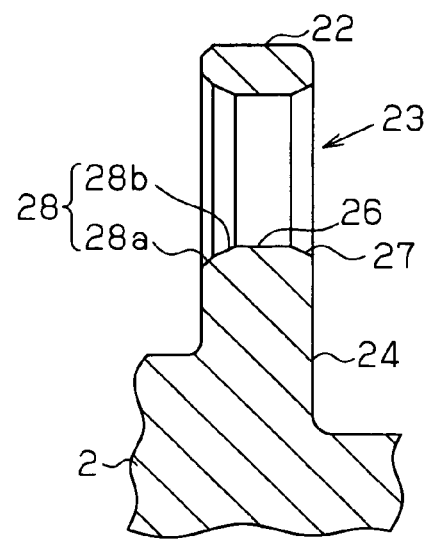
FIG. 2(a) shows the state of the brake rotor mounting surface before finishing.
Figure 2B:
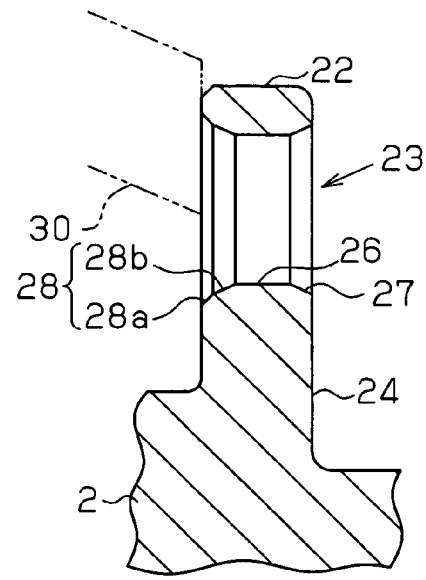
FIG. 2(b) shows the state of the brake rotor mounting surface during finishing.
Figure 2C:
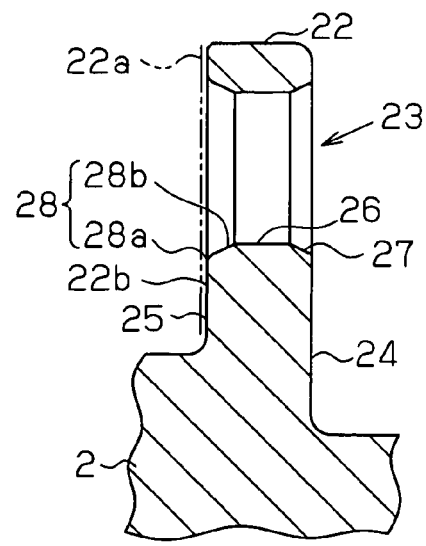
FIG. 2(c) shows the state of the brake rotor mounting surface after finishing.
Figure 4:
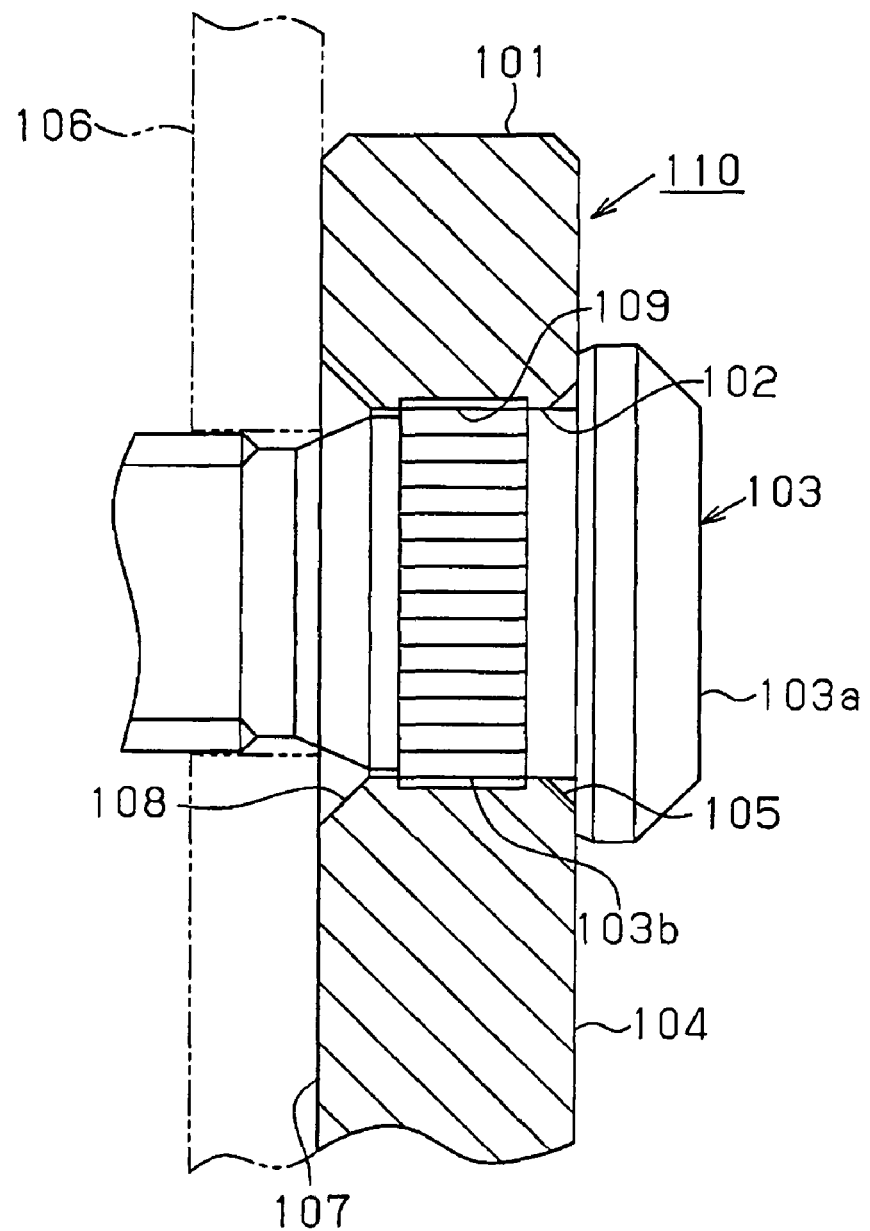
FIG. 4 is a diagram illustrating the shape of a bolt hole of a flange in a conventional hub unit and the state in which a bolt is press fitted in the bolt hole.
Figure 5:
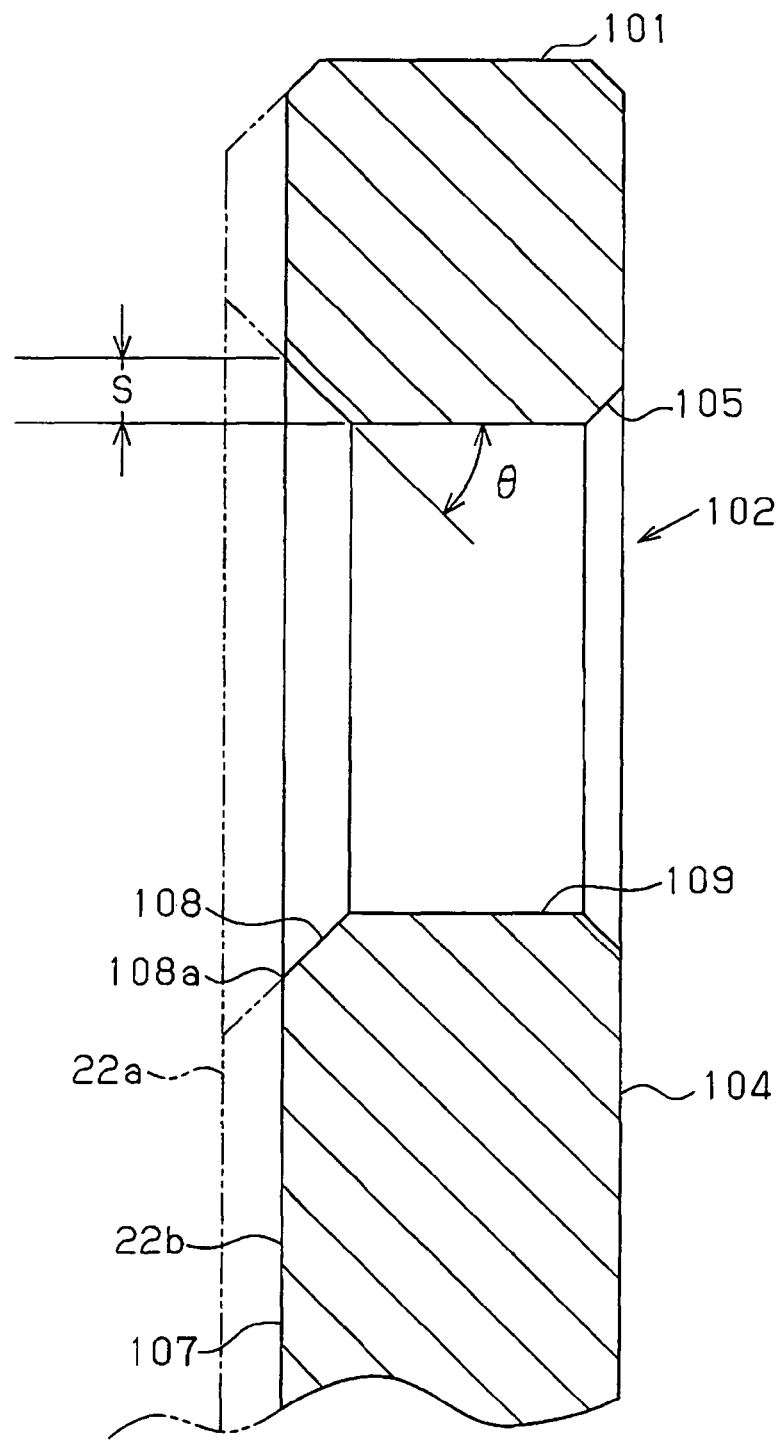
FIG. 5 is an enlarged view illustrating the bolt hole of the conventional hub unit.

As shown in FIGS. 2(a) to 2(c), machining of the wheel hub 2 is characterized in that the bolt holes 23 are machined first (FIG. 2(a)), and after that, finishing of the brake rotor mounting surface 25 is performed (FIG. 2(c)) from a surface before finishing 22a shown by a chain double-dashed line to a finished surface 22b shown by a solid line using an abrasive tool 30 (FIG. 2(b)). When machining is performed in this order, although the flange 22 is deformed by machining the bolt holes 23, the brake rotor mounting surface 25 is finished with high accuracy (FIG. 2(c)) since finishing of the brake rotor mounting surface 25 is performed after the deformation. Therefore, the influence of runout of the brake rotor 4 that arise from deformation of the flange 22 caused by machining the bolt holes 23 is avoided.

Also, as shown in FIG. 2(c), each bolt hole 23 is formed to extended through the bolt seating surface 24 on which the head portion 52 of the associated bolt 5 abuts against and the brake rotor mounting surface 25 on which the brake rotor 4 (see FIG. 1) is mounted. A small diameter portion 26 having a cylindrical inner circumferential surface is formed at the center portion of each bolt hole 23. Each bolt hole 23 is provided with a first widening portion 27, which is tapered to widen from the small diameter portion 26 toward the bolt seating surface 24. Each bolt hole 23 is provided with a second widening portion 28, which is tapered to widen from the small diameter portion 26 toward the brake rotor mounting surface 25. The first widening portion 27 and the second widening portion 28 are provided to prevent part of the flange 22 around each bolt hole 23 from bulging to the bolt seating surface 24 and the brake rotor mounting surface 25 when the associated bolt 5 is press fitted in the bolt hole 23.

As shown in FIG. 3, the second widening portion 28 is formed by two tapered surfaces 28a, 28b, which have different taper angles with respect to the axis of the bolt hole 23 from an opening rim 29 of the bolt hole 23 toward the inside of the bolt hole 23. The taper angle α of the outer tapered surface 28a connected to the opening rim 29 is greater than the taper angle β of the inner tapered surface 28b. More specifically, the outer taper angle α is set to 45 to 70 degrees, and the inner taper angle β is set to 15 to 40 degrees. As shown in FIGS. 2(b), 2(c), and 3, the outer tapered surface 28a is formed such that at least part of the outer tapered surface 28a remains although it is scraped off during finishing of the brake rotor mounting surface 25. Burrs are easily formed on the opening rim 29 of each bolt hole 23 mainly in the radial direction during finishing of the brake rotor mounting surface 25. However, burrs are suppressed from being formed on the opening rim 29 by increasing the outer taper angle α. If burrs are formed on the opening rim 29, the burrs might be sandwiched between the brake rotor 4 and the brake rotor mounting surface 25 when the brake rotor 4 is mounted on the brake rotor mounting surface 25. Also, the burrs sandwiched between the brake rotor 4 and the brake rotor mounting surface 25 might become a factor of runout of the brake rotor 4. Therefore, such burrs are preferably not formed as much as possible. In this point of view, the taper angle α of the outer tapered surface 28a is set great such that burrs are suppressed from being formed on the opening rim 29 during finishing of the brake rotor mounting surface 25, and operation for removing burrs on the opening rim 29 after finishing the brake rotor mounting surface 25 becomes unnecessary. The taper angle of the first widening portion 27 is set to an angle approximately equal to the taper angle β of the outer tapered surface 28b of the second widening portion 28.

As described above, the taper angle α of the outer tapered surface 28a is set to prevent burrs from being formed during finishing of the brake rotor mounting surface 25. Thus, the axial length L1 (see FIG. 3) of the outer tapered surface 28a may be set such that a small part of the outer tapered surface 28a remains after it is scraped off during finishing of the brake rotor mounting surface 25 as described above. In contrast, as for the inner tapered surface 28b, a gap needs to be formed between the bolt 5 and the inner circumferential surface of the bolt hole 23 for permitting part of the flange that is displaced when the bolt 5 is press fitted to escape. Therefore, the inner tapered surface 28b has the taper angle β and the axial length L2 (see FIG. 3) that are necessary for forming the gap that permits part of the flange to escape. When the taper angle β of the inner tapered surface 28b is set great, the bore diameter of the opening rim 29 of the bolt hole 23 might vary greatly in accordance with the machining accuracy of the second widening portion 28 and the machining accuracy of the finishing of the brake rotor mounting surface 25. Also, if the inner diameter of the opening rim 29 is increased, the gap between the opening rim 29 and the shaft portion of the bolt 5 (approximately equal to the gap Sa of FIG. 3) is excessively increased, and the tightening force of the bolt 5 might be reduced. Thus, as for the inner taper angle β, it is not necessary to take into consideration the generation of burrs, and the inner taper angle β is preferably set to an angle appropriate for avoiding bulging of part of the flange. Therefore, the axial length L2 needs to be set to an appropriate value in accordance with the inner taper angle β.

The taper angle and the length in the axial direction of the first widening portion 27 is set such that part of the flange that is displaced when press fitting the bolt 5 is permitted to escape between the inner circumferential surface of the bolt hole 23 and the bolt 5, thus preventing part of the flange from bulging on the bolt seating surface 24. However, the first widening portion 27 may be omitted when the influence of the bulging of part of the flange on the bolt seating surface 24 is small. Also, when the first widening portion 27 is provided, the first widening portion 27 may be formed by two tapered surfaces like the second widening portion 28, and the bolt seating surface 24 may be machined after machining the bolt holes 23. When burrs are formed on the opening rims in the bolt seating surface 24, the bolts 5 might not securely contact the bolt seating surface 24. As a result, the tightening force of the bolt 5 might become insufficient. However, burrs are suppressed from being generated by machining the bolt holes 23 and the bolt seating surface 24 as described above.

As described above, each bolt hole 23 includes the small diameter portion 26, the first widening portion 27, and the second widening portion 28. All the elements configuring the bolt hole 23 are machined by a series of processes during cutting of the wheel hub 2 executed before finishing the brake rotor mounting surface 25. As described above, although finishing of the brake rotor mounting surface 25 is performed after machining the bolt holes 23, the bolt holes 23 are configured such that a process for removing burrs on the opening rims 29 is not necessary after finishing. Therefore, in the machining process of the wheel hub 2 according to the preferred embodiment, extra work such as setup is reduced as compared to the conventional apparatus, and the operating efficiency is improved.

Since the hub unit 1 and the wheel hub 2 of the preferred embodiment are configured as described above, deformation of the brake rotor mounting surface 25 caused by machining of the bolt holes 23 is eliminated, and generation of burrs by finishing the brake rotor mounting surface 25 and deformation of the brake rotor mounting surface 25 caused by press fitting the bolts 5 into the bolt holes 23 are reduced. As described above, the configuration that becomes the factor of runout of the brake rotor 4 is modified. Also, the processability of the wheel hub 2 is improved since all the elements configuring each bolt hole 23 are formed by a series of processes before finishing the brake rotor mounting surface 25, and operation for removing burrs is not required after finishing the brake rotor mounting surface 25.

In the preferred embodiment, the hub unit 1 for driving wheel is explained as an example, but the present invention may be applied to a hub unit for a driven wheel.

The invention claimed is:

1. A wheel hub comprising:
   a flange for mounting a brake rotor, which flange is formed to face radially outward, and
   a plurality of bolt holes formed in the flange,
   wherein a plurality of bolts for mounting the brake rotor are press fitted and secured in the bolt holes, each bolt hole including a widening portion, which is tapered to widen from a center portion of the bolt hole to a brake rotor mounting surface of the flange, the widening portion being formed by two tapered surfaces comprising different taper angles with respect to an axis of the bolt hole from an opening rim of the bolt hole toward an inside of the bolt hole, and the taper angle of an outer tapered surface connected to the opening rim is greater than the taper angle of an inner tapered surface connected to the outer tapered surface, the outer tapered surface being formed along an entire circumference of the bolt hole and the taper angles comprising angles such that the inner tapered surface comprises an increasing diameter in the axial direction and the outer tapered surface comprises an increasing diameter in the axial direction, and
   wherein an axially innermost side of the outer tapered surface is disposed radially outward of an axially innermost side of the inner tapered surface.

2. The wheel hub according to claim 1, wherein the brake rotor mounting surface comprises a surface finished alter machining the bolt holes.

3. A hub unit comprising the wheel hub according to claim 1.

4. A method for machining the wheel hub according to claim 1, the method comprising:
   machining the bolt holes by a series of machining processes; and
   finishing the brake rotor mounting surface after the machining the bolt holes.

5. A hub unit comprising the wheel hub according to claim 2.

6. A method for machining the wheel hub according to claim 2, the method comprising:
   machining the bolt holes by a series of machining processes; and
   finishing the brake rotor mounting surface after the machining the bolt holes.

7. The wheel hub according to claim 1, wherein the outer tapered surface is symmetrical about the axis of the bolt hole.

8. The wheel hub according to claim 1, wherein the inner tapered surface is symmetrical about the axis of the bolt hole.

9. The wheel hub according to claim 1, wherein the outer tapered surface is symmetrical about the axis of the bolt hole, and
   wherein the inner tapered surface is symmetrical about the axis of the bolt hole.

10. The wheel hub according to claim 1, wherein an axial depth of the inner tapered surface is greater than an axial depth of the outer tapered surface.

11. The wheel hub according to claim 1, wherein the taper angle of the outer tapered surface comprises a range of 45 degrees to 70 degrees.

12. The wheel hub according to claim 1, wherein the taper angle of the inner tapered surface comprises a range of 14 degrees to 40 degrees.

13. The wheel hub according to claim 1, wherein the bolt holes comprise other widening portions on an axial side of the bolt holes opposite the widening portion.

14. The wheel hub according to claim 13, wherein the other widening portion comprises a taper angle substantially equal to the taper angle of inner tapered surface.

15. The method according to claim 4, wherein the finishing the brake rotor mounting surface occurs before inserting the bolts in the bolt holes.

16. The method according to claim 1, wherein the taper angles are other than zero degrees.

* * * * *